US010701297B2

(12) United States Patent
Li et al.

(10) Patent No.: US 10,701,297 B2
(45) Date of Patent: Jun. 30, 2020

(54) FULL-FRAME IMAGE SENSOR SYSTEM

(71) Applicants: SHANGHAI IC R&D CENTER CO., LTD., Shanghai (CN); CHENGDU IMAGE DESIGN TECHNOLOGY CO. LTD., Chengdu (CN)

(72) Inventors: Chen Li, Shanghai (CN); Jianxin Wen, Shanghai (CN); Xiaoliang Zhang, Shanghai (CN); Changming Pi, Shanghai (CN); Hailing Yang, Shanghai (CN); Guidi Zhang, Shanghai (CN)

(73) Assignees: SHANGHAI IC R&D CENTER CO., LTD, Shanghai (CN); CHENGDU IMAGE DESIGN TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 16/469,614

(22) PCT Filed: Nov. 22, 2017

(86) PCT No.: PCT/CN2017/112351
§ 371 (c)(1),
(2) Date: Jun. 13, 2019

(87) PCT Pub. No.: WO2018/121135
PCT Pub. Date: Jul. 5, 2018

(65) Prior Publication Data
US 2020/0092501 A1 Mar. 19, 2020

(30) Foreign Application Priority Data
Dec. 27, 2016 (CN) .......................... 2016 1 1225827

(51) Int. Cl.
*H04N 5/374* (2011.01)
*G06T 3/40* (2006.01)
*H04N 5/378* (2011.01)

(52) U.S. Cl.
CPC .......... *H04N 5/374* (2013.01); *G06T 3/4023* (2013.01); *H04N 5/378* (2013.01)

(58) Field of Classification Search
CPC ..................................................... H04N 5/374
(Continued)

(56) References Cited

U.S. PATENT DOCUMENTS

| 7,750,278 B2 * | 7/2010 | Oike ................. H04N 5/35563 250/208.1 |
| 2004/0135910 A1 | 7/2004 | Nam |
| 2015/0264286 A1 * | 9/2015 | Yamaoka ............... H04N 5/376 348/302 |

FOREIGN PATENT DOCUMENTS

| CN | 103281494 A1 | 9/2013 |
| CN | 103402063 A1 | 11/2013 |
| CN | 104754252 A1 | 7/2015 |

* cited by examiner

*Primary Examiner* — Joel W Fosselman
(74) *Attorney, Agent, or Firm* — Tianchen LLC; Yuan R. Li; Yi Fan Yin

(57) ABSTRACT

A full-frame image sensor system comprises at least a pair of readout circuits, at least a pair of channel selection circuits, and at least a pair of interface circuits arranged symmetrically with respect to a pixel array; the readout circuits are electrically connected to two sides of the pixel array respectively; the channel selection circuit and the readout circuit on a same side of the pixel array are electrically connected to each other. The interface circuit and the channel selection circuit on a same side of the pixel array are electrically connected to each other. As a result, the circuits on the two sides of the pixel array are substantially symmetrical, the center of the pixel array coincides with the center of the entire chip. It not only brings convenience to the subsequent packaging and application, but also reduces the size of circuit such as the PGA and the ADC on one side of the pixel array, and overcomes the problem that the (Continued)

capacity of circuit such as the PGA and the ADC cannot be increased when the height of the circuits such as the PGA and the ADC cannot exceed the height of the pixel array.

12 Claims, 3 Drawing Sheets

(58) Field of Classification Search
USPC .......................................................... 348/308
See application file for complete search history.

FULL-FRAME IMAGE SENSOR SYSTEM

CROSS-REFERENCE TO RELATED APPLICATION

This application claims priority of International Patent Application Serial No. PCT/CN2017/112351, filed Nov. 22, 2017, which is related to and claims priority of Chinese patent application Serial No. 201611225827.8, filed Dec. 27, 2016. The entirety of each of the above-mentioned patent applications is hereby incorporated herein by reference and made a part of this specification.

TECHNICAL FIELD

The present disclosure relates to the technical field of image sensors, in particular to a full-frame image sensor system.

BACKGROUND

The full-frame is for the size of the traditional 35 mm film. The size of the full-frame digital single-reflection CMOS photosensitive imaging element is the same as the size of the traditional 35 mm film, and is generally close to 36 mm×24 mm. In the SLR camera, the full-frame camera belongs to a High-end camera, such as Nikon D5, Sony Alpha 7RM2, Canon EOS 6D, etc., and the full-frame image sensor is adopted by the full-frame camera. In general, since the size of the full-frame sensor array is large, the pixel size with the same number of pixels is also large, the better image quality and the color expressive can be obtained.

The signal reading principle of the traditional Rolling Shutter Pixel is that, when TX is set to be high level, the PD signal is transmitted; when the gate signal RX of the NMOS transistor is pulled to a high level, the charges of the FD point is emptied and reset, the RX signal is set to a low level, the gate signal of the other NMOS transistor is set to a high level, the signal of the PD is transmitted to the FD point, and then the signal is read out. In other words, for the x-row and y-column of the image sensor composed of traditional roller pixels, the exposure time of the first-row in the first-column is not the same as the exposure time of the xth-row in the xth-column. This asynchrony does not have a problem for the ordinary camera applications, but it can cause significant image distortion when shooting images at high frame rates.

SUMMARY

The present disclosure aims to overcome the defects in the prior art, the invention aims to provide a full-frame image sensor system which is used for improving the accuracy of images.

In order to achieve the aim, the invention provides a full-frame image sensor system which is integrated in a chip and comprises: a pixel array, at least a pair of readout circuits, at least a pair of channel selection circuits, at least a pair of interface circuits and a control circuit, at least a pair of power input-output interfaces and at least a pair of auxiliary circuits; wherein taking the pixel array as the center, the readout circuits, the channel selection circuits and the interface circuits are symmetrically arranged on the two sides of the pixel array respectively, so that the center of the pixel array coincides with the center of the entire chip; the readout circuits are electrically connected to the pixel array from the two sides of the pixel array respectively; the channel selection circuit and the readout circuit on the same side of the pixel array are electrically connected to each other; and the interface circuit and the channel selection circuit on the same side of the pixel array are electrically connected to each other; wherein the pixel array is used for detecting an image signal and outputting the obtained image signal to the readout circuit; the readout circuit is used for receiving the image signal from the pixel array, amplifying the image signal, converting the image signal into a digital signal, and then outputting the digital signal to the channel selection circuit; the channel selection circuit is used for amplifying the digital signal and then performing selective transmission; the interface circuit is used for outputting the digital signal to the output interface; the control circuit is connected to the readout circuit, the channel selection circuit and the interface circuit, and is used for controlling the transmission and working time sequence of each circuit; the power input-output interfaces are respectively arranged above and below the pixel array, and used for inputting or outputting power of each circuit; the auxiliary circuits are arranged above and below the pixel array respectively, are used for providing a reference voltage and a reset voltage for the whole circuit.

Preferably, the readout circuits on the two sides of the pixel array are divided into an upper readout circuit and a lower readout circuit; the channel selection circuits on the two sides of the pixel array are divided into an upper channel selection circuit and a lower channel selection circuit; the interface circuits on the two sides of the pixel array are divided into an upper interface circuit and a lower interface circuit; the upper readout circuit on the one side is electrically connected to the upper layer area of the pixel array, and the upper readout circuit on the other side is electrically connected to one side of the upper channel selection circuit, and the other side of the upper channel selection circuit is electrically connected to the upper interface circuit; and the lower readout circuit on the one side is electrically connected to the lower layer area of the pixel array, and the lower readout circuit on the other side is electrically connected to one side of the lower channel selection circuit, and the other side of the lower channel selection circuit is electrically connected to the lower interface circuit.

Preferably, the pixel array comprises an active pixel array used for acquiring image detection signal, a dark pixel array used for providing a reference signal without light, a dummy pixel array used for protecting the active pixel array, a reference pixel array used for providing a reference signal, and a barrier array used for isolating the pixel array; wherein after subtracting the reference signal of the dark pixel array and the reference signal of the reference pixel array from the image detection signal of the active pixel array, the final image signal for outputting to the readout circuit is obtained.

Preferably, the dummy pixel array is arranged around the active pixel array, the dark pixel array and the reference pixel array are arranged sequentially outwards from the same side of the active pixel array; and the barrier array is arranged around the dark pixel array, the reference pixel array and the dummy pixel array. Preferably, the total pixel size of the pixel array is (3684-4512)×(5400-6600), and the pixel size of the active pixel array is (3600-4400)×(5400-6600), the pixel size of the dark pixel array is (80~96)×(3604-6616), the pixel of the dummy pixel array and the barrier array are 22-36 rows, the pixel of the reference pixel array is 4-16 rows.

Preferably, the readout circuit comprises a readout circuit link corresponding to one row of the pixel array; each readout circuit link includes a PGA (Programmable Gain Amplifier) and an ADC; the PGA is used for amplifying the image signal, the ADC (Analog-to-Digital Converter) is used for converting the amplified image signal into a digital signal.

Preferably, the channel selection circuit comprises a digital gain circuit and a column selection circuit; the digital gain circuit is used for amplifying the digital signal outputted by the readout circuit, the column selection circuit is used for selectively transmitting the digital signal amplified by the digital gain circuit.

Preferably, the interface circuit comprises a low-voltage differential signal interface (LVDS), an interface circuit control channel and an interface circuit clock signal channel; the low-voltage differential signal interface is used for outputting digital data, and the interface circuit control channel is used for controlling the setting of the low-voltage differential signal interface and frame frequency information; the interface circuit clock signal channel is used for providing the clock information to the interface circuit control channel.

Preferably, the control circuit includes a row decoding circuit and a digital signal control circuit; the row decoding circuit is used for controlling the transmission of the row direction of the readout circuit, the channel selection circuit and the interface circuit; the digital signal control circuit is used for controlling the time sequence, the exposure time, the readout way and the readout mode of the readout circuit, the channel selection circuit and the interface circuit.

Preferably, the auxiliary circuit comprises reference clock circuits, reference voltage circuits, reference pulse circuits, and a power-on reset circuit; wherein the two sides of the control circuit are respectively provided with one of the reference clock circuits; the reference clock circuits on the two sides of the control circuit are respectively connected to one of reference voltage circuits; and the reference pulse circuits are arranged above the readout circuits on the two sides of the pixel array respectively, the reference pulse circuit is electrically connected to the corresponding readout circuit below the reference pulse circuit; the power-on reset circuit is integrated into one; the reference clock circuit is used for providing a clock signal for the whole system, and the reference voltage circuit is used for providing a reference voltage for the whole system, the reference pulse circuit is used for providing a reference pulse signal for the whole system, the power-on reset circuit is used for resetting the digital signal control circuit of the whole system after power on or when there is a power jump.

Preferably, the reference clock circuit includes a phase-locked loop module, the reference voltage circuit includes a bandgap reference voltage module, the reference pulse circuit includes a ramp generating circuit and an analog driving circuit; the ramp generating circuit is used for generating a reference pulse waveform; the analog driving circuit provides driving force for the reference pulse circuit.

Preferably, the power input-output interface comprises a power positive interface, a power ground interface, a power switch, a control power interface of the whole system, a test interface, a power positive interface and the ground interface of each circuit.

Firstly, the layout area of the readout circuit, the channel selection circuit, and the interface circuit is large and wide in the prior art, if placed on one side of the Pixel Array, the center of the Pixel Array will be greatly deviated from the center of the entire chip. In the embodiments of the present disclosure, the pair of readout circuits, the pair of channel selection circuits and the pair of interface circuits are arranged on the two sides of the pixel array, and the symmetry of output signals on both sides of the Pixel Array can be guaranteed by using the method of processing the pixel signals of even columns and odd columns on both sides respectively, so that the center of the pixel array can coincide with or almost coincide with the center of the entire chip, which brings convenience to package and subsequent chip application. Secondly, the single-side signal processing method is more suitable for pixels with larger sizes in the prior art, but if the height of the pixel size is small (such as 2.0 um), the height of the corresponding circuits such as the height of corresponding PGA, ADC shall not exceed the height of the pixel size (such as 2.0 um). However, due to the limitation of process device, the fixed height of some capacitors may have exceeded the height of the pixel size (for example, the height of the capacitor is 2.5 um). Therefore, the method for respectively processing the signal of the even-numbered columns on the left side and the signal of the odd-numbered columns on the right side is adopted according to the present disclosure, so that the height requirement of a circuit such as the PGA and the ADC (Analog-to-Digital Converter) and the like in the single-side of the pixel array is relaxed from 1-time that of the pixel to 2-times that of the pixel, the problem that the capacity of circuits such as PGA, ADC and the like cannot increase if the height of the circuits such as PGA, ADC and the other cannot exceed the height of the pixel array can be overcome, and using smaller size pixels for such image sensors is made possible.

BRIEF DESCRIPTION OF THE DRAWINGS

In order to better understand the purposes, features and advantages of the present disclosure, the preferred embodiments of the present disclosure will be described in detail below with reference to the accompanying drawings, wherein.

DETAILED DESCRIPTION

In order to make the contents of the present disclosure more comprehensible, the contents of the present disclosure are further described below in conjunction with the description of the specification. Of course, the present disclosure is not limited to the specific embodiment, the general replacement well known by those skilled in the art is also covered by the scope of the present disclosure.

The present disclosure is further described in detail below in combination with attached FIGS. 1-3 and specific embodiments. It should be noted that the attached figures are in a very simplified form and use imprecise proportions and are only used for the convenience and clarity of auxiliary illustration of the present embodiment.

Figure 1:
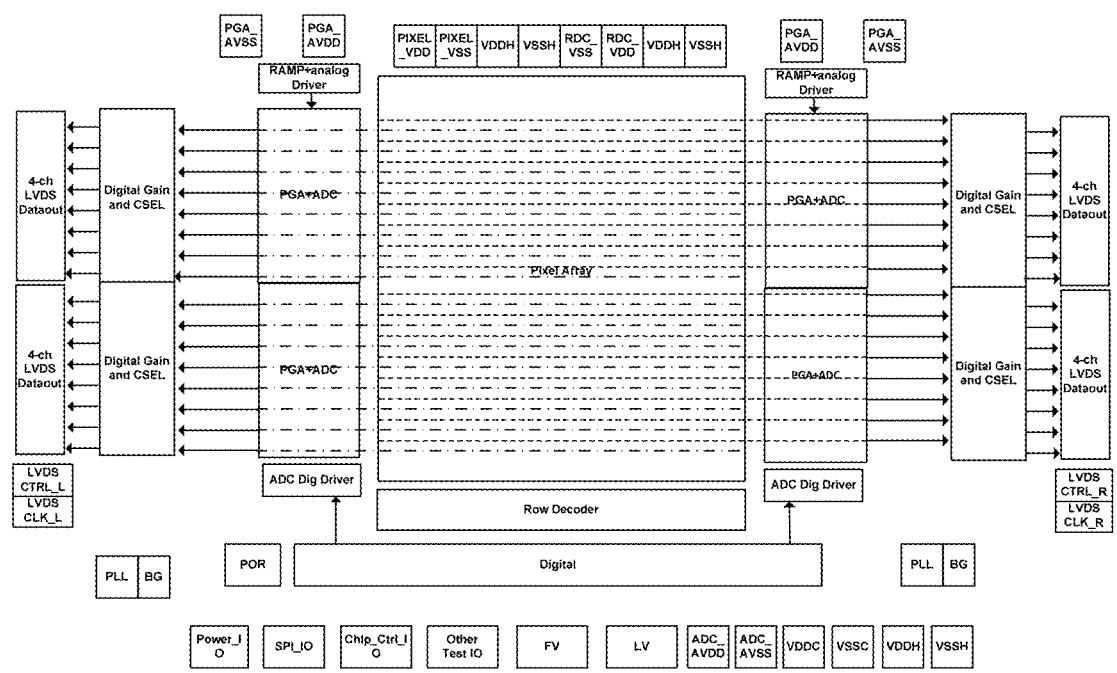
FIG. 1 is a schematic structural diagram of a full-frame image sensor system according to a preferred embodiment of the present disclosure
Figure 2:
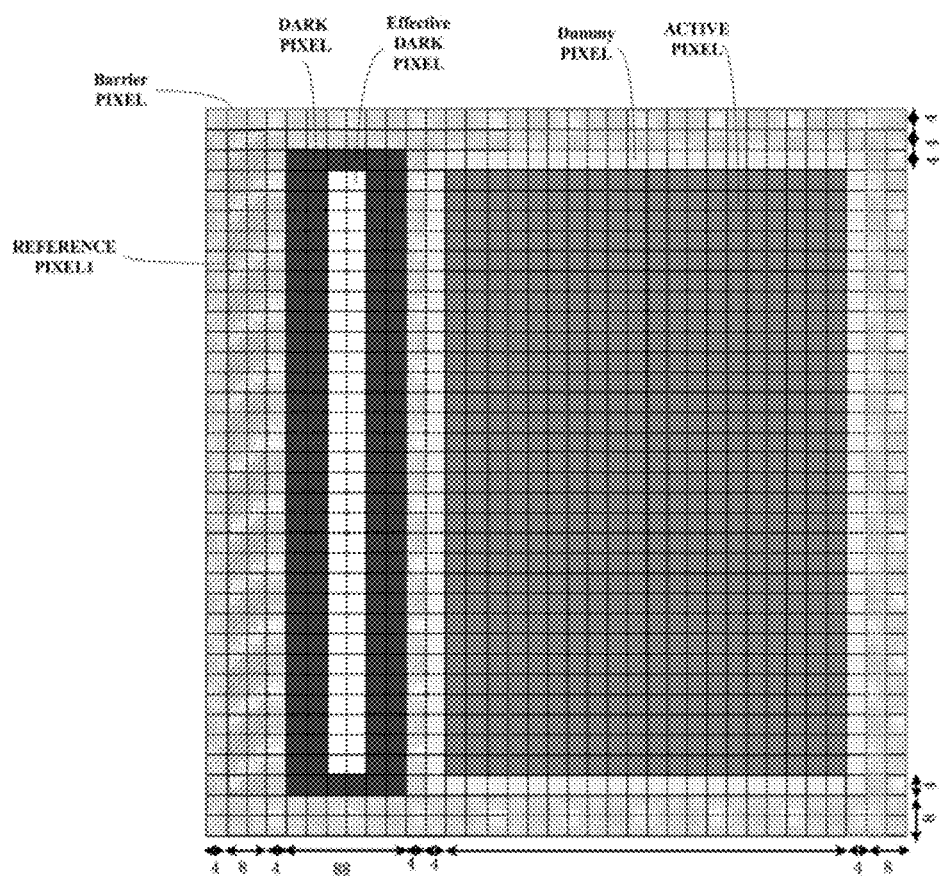
FIG. 2 is a schematic structural diagram of a pixel array according to a preferred embodiment of the present disclosure

Referring to FIG. 1, a full-frame image sensor system according to an embodiment of the present disclosure is integrated in a chip, and the full-frame image sensor system includes a pixel array, a pair of readout circuits, a pair of channel selection circuits, a pair of interface circuits and a control circuit, a pair of power input-output interfaces and a pair of auxiliary circuits.

Specifically, the arrangement of the circuits in the full-frame image sensor system of the embodiment is as follows: taking the pixel array as the center, the pair of readout circuits, the pair of channel selection circuits and the pair of interface circuits are symmetrically arranged on the two sides of the pixel array respectively, so that the center of the pixel array coincides with the center of the entire chip. The pair of readout circuits are electrically connected to the pixel array from the two sides of the pixel array respectively; the channel selection circuit and the readout circuit on the same side of the pixel array are electrically connected to each other; and the interface circuit and the channel selection circuit on the same side of the pixel array are electrically connected to each other, the pair of power input-output interfaces are respectively arranged above and below the pixel array, the pair of auxiliary circuit are arranged above and below the pixel array respectively.

Wherein the readout circuits on the two sides of the pixel array are divided into an upper readout circuit and a lower readout circuit; each of the channel selection circuits on the two sides of the pixel array is divided into an upper channel selection circuit and a lower channel selection circuit; each of the interface circuits on the two sides of the pixel array is divided into an upper interface circuit and a lower interface circuit, so that the pair of readout circuits have four regions in total, the pair of channel selection circuits have four regions in total, the pair of interface circuits have four regions in total. Specifically, the upper readout circuit on the one side is electrically connected to the upper layer area of the pixel array, and the upper readout circuit on the other side is electrically connected to one side of the upper channel selection circuit, and the other side of the upper channel selection circuit is electrically connected to the upper interface circuit; and the lower readout circuit on the one side is electrically connected to the lower layer area of the pixel array, and the lower readout circuit on the other side is electrically connected to one side of the lower channel selection circuit, and the other side of the lower channel selection circuit is electrically connected to the lower interface circuit.

The pixel array is used for detecting an image and outputting the obtained image signal to the pair of readout circuits. Referring to FIG. 2, the pixel array comprises an active pixel array used for acquiring image detection signal, and a dark pixel array used for providing a reference signal without light, a dummy pixel array used for protecting the active pixel array, a reference pixel array used for providing a reference signal, and a barrier array used for isolating the pixel arrays. The dark pixel array includes an active dark pixel array; wherein after subtracting the reference signal of the dark pixel array and the reference signal of the reference pixel array from the image signal of the active pixel array, the final image signal for outputting to the readout circuit is obtained. The dummy pixel array is arranged around the active pixel array, the dark pixel array and the reference pixel array are arranged sequentially outwards from the same side of the active pixel array; and the barrier array is arranged around the dark pixel array, the reference pixel array and the dummy pixel array. Herein, the dummy pixel array and the barrier pixel array in the pixel array are not processed.

In the embodiment, the total pixel size of the pixel array adopted is (3684~4512)×(5400~6600), wherein the minimum read-out row pixel is 3684 (4+80+3600), wherein the read-out row pixel includes four rows of the reference pixels, 80 rows of the dark pixels and 3600 rows of the active pixels. The maximum read-out row pixel is 4512 (16+96+4400) for indicating that the read-out row pixel includes 16 rows of the reference pixels, 96 rows of the dark pixels and 4400 rows of the active pixels, and preferably, the read-out row pixel is 4096 (8+88+4000) for indicating that the read-out row pixel includes 8 rows of the reference pixels, 88 rows of the dark pixels and 4000 rows of active pixels. The minimum read-out column pixel is 5400, the maximum read-out column pixel is 6600, and preferably 6000. The pixel size of the active pixel array is (3600~4400)×(5400~6600), and preferably 4000~6000. The pixel size of the dark pixel array is (80~96)×(3604~6616), and preferably 88×6008. The pixels of the dummy pixel array and the barrier array are 22 to 36 rows, and preferably 28 rows. The reference pixel array has 4~16 rows of pixels, and preferably 8 rows.

Referring to Table 1, the pixel size of each pixel array in the embodiment is illustrated. In Table 1, the total pixel resolution of the pixel array is 4124×6024, wherein the size of each pixel array is shown:

TABLE 1

| Pixels | Size |
| --- | --- |
| Active Pixels | 4000 * 6000 |
| Dark Pixels | 88 * 6008 |
| Dummy Pixels and barrier pixels | 28 rows |
| Reference Pixels | 8 rows |
| Total readout row pixels | 4096 (8 + 88 + 4000) |
| Total readout column pixels | 6000 |

Referring to FIG. 2 again, in the row direction of the pixel array, a total of eight-row barrier pixel on the left side and the right side of the reference pixel will not be processed, the eight-row barrier pixel and the eight-row dummy pixel between the dark pixel and the active pixel will not be processed. The rightmost four-row dummy pixels and the eight-row barrier pixels will not be processed. In the column direction of the pixel array, the uppermost four-row dummy pixels and the eight-row barrier pixels will not be processed, the lowermost four-row dummy pixels and eight-row barrier pixels will not be processed. The reference pixel is located on the left side of the pixel array, with a total of 88 rows, for testing all Analog-to-Digital Converters (ADC). The maximum pixel size which can be achieved by the total pixel array shown in Table 1 is 4096*6000 and can also carry out row direction selection according to requirements, namely windowing operation.

Referring to FIG. 1 again, the readout circuit acquires image signals from the pixel array, amplifies the image signal, converts it into the digital signal, and outputs it to the channel selection circuit. The readout circuit includes readout circuit links corresponding to each row of the pixel array respectively. Each of the readout circuit links includes a Programmable Gain Amplifier (PGA) and an Analog to Digital Converter (ADC). The PGA is used for amplifying the image signal, the ADC is used for converting the amplified image signal into a digital signal.

For example, the active pixel array of an image sensor has 4000 rows and 6000 columns in total. Each odd column corresponds to one readout circuit link, the readout circuit link is arranged on the right side of the pixel array, to read out 1, 3, 5 . . . 5999 column signals of the pixel array, and each even column corresponds to one readout circuit link, the readout circuit link is arranged on the left side of the pixel array, to read out 2, 4, 6 . . . 6000 column signals of the pixel array. Each readout circuit link includes PGA+ADC. Wherein the function of the PGA is to amplify the image signal, namely the photoelectric analog signal outputted by the pixel array, and the amplification gain is 16 times; the function of the ADC is to convert the amplified photoelectric analog signal into 12 bit or 10 bit digital signal. Thus, the readout circuit links are divided into a left part and a right part, that is, 3000 PGAs and 3000 ADCs are arranged on the left side in total, and 3000 PGAs and 3000 ADCs are arranged on the right side in total. The sensor includes 6000 PGAs and 6000 ADCs in total when in the left part and the right part.

The channel selection circuit is used for selective transmission of the digital signal after the process of the amplification. The channel selection circuit includes a digital gain circuit (digital gain) and a column selection circuit (column selector). The digital gain circuit is used for amplifying the digital signal outputted by the readout circuit, the column selection circuit is used for selectively transmitting the digital signal amplified by the digital gain circuit.

For example, after the image signal is analog amplified and analog-to-digital converted into digital signals, the digital signals of each column are ready to be transmitted, at this moment, the readout circuit on the left side and the right side are respectively provided with 3000 digital signals waiting to be transmitted. Before transmission, each digital signal is amplified by the digital gain circuit, and the amplification factor can be eight times.

After being amplified, the 3000 digital signals in the digital gain circuit on the left side and the 3000 digital signals in the right side respectively have been amplified and waiting to be transmitted. At this moment, the column selector (CSEL) is used for selecting the digital signals one by one for transmission. Each side of the column selector is divided into an upper part and a lower part.

Take the right side as an example, the column selector module in upper part of the right side is divided into four sub-modules, CSEL_R_UP1 (not shown), CSEL_R_UP2 (not shown), CSEL_R_UP3 (not shown), CSEL_R_UP4 (not shown), the four sub-modules are the same. The CSEL_R_UP1 transmits the data of the first column to the interface circuit in the first time period, wherein the interface circuit is a high-speed interface (low-voltage differential signal interface, LVDS dataout), the data of the third column is transmitted to the LVDS dataout in the second time period, . . . , the data of the 749th column is transmitted to the LVDS dataout in the 375th time period; the CSEL_R_UP2 transmits the data of the 751th column to the LVDS dataout in the first time period, the data of the 753th column is transmitted to the LVDS dataout in the second time period, the data of the 1499th column is transmitted to the LVDS dataout in the 375th time period; and the CSEL_R_UP3 transmits the data of the 1501th column to the LVDS dataout in the first time period, the data of the 1503th column is transmitted to the LVDS dataout in the second time period, . . . , the data in the 2249th column is transmitted to the LVDS dataout in the 375th time period; the CSEL_R_UP4 transmits the data of the 2251th column to the LVDS dataout in the first time period, the data of the 2253th column is transmitted to the LVDS dataout in the second time period, . . . , the data of the 2999th column is transmitted to the LVDS dataout in the 375th time period.

Take the right side as an example, the column selector module in lower part of the right side is also divided into four sub-modules, CSEL_R_DOWN1 (not shown), CSEL_R_DOWN2 (not shown), CSEL_R_DOWN3 (not shown) and CSEL_R_DOWN4 (not shown), the four sub-modules are the same. The CSEL_R_DOWN1 transmits the data of the (3000+1)th column to the high-speed interface in the first time period, the data of the (3000+3)th column is transmitted to the high-speed interface in the second time period, . . . , the data of the (3000+769)th column is transmitted to the high-speed interface in the 375th time period; the CSEL_R_DOWN 2 transmits the data of the (3000+751)th column to the high-speed interface in the first time period, the data of the (3000+753)th column is transmitted to the high-speed interface in the second time period, . . . , the data of the (3000+1499)th column is transmitted to the high-speed interface in the 375th time period; and the CSEL_R_DOWN 3 transmits the data of the (3000+1501)th column to the high-speed interface in the first time period, the data of the (3000+1503)th column is transmitted to the high-speed interface in the second time period, . . . , the data of the (3000+2249) th column is transmitted to the high-speed interface in the 375th time period; the CSEL_R_DOWN 4 transmits the data of the (3000+2251)th column to the high-speed interface in the first time period, the data of the (3000+2253)th columns is transmitted to the high-speed interface in the second time period, . . . , the data of the 5999th column is transmitted to the high-speed interface in the 375th time period.

The interface circuit is used for outputting digital signals to the output interface; please refer to FIG. 1, wherein the interface circuit includes a low-voltage differential signal interface (LVDS dataout), an interface circuit control channel (LVDS_CTRL) and an interface circuit clock signal channel (LVDS_CLK). The low-voltage differential signal interface is used for outputting digital data; the interface circuit control channel is used for controlling the setting information of the low-voltage differential signal interface and the frame frequency information of the low-voltage differential signal interface; the interface circuit clock signal channel provides the clock information to the interface circuit control channel.

For example, as shown in FIG. 1, a low-voltage differential signal interface (LVDS dataout) includes a left part and a right part, and each part includes an upper part and a lower part, the upper part of the left side is a four-channels LVDS data interface, and the lower part of the left side is a four-channels LVDS data interface, the upper part of the right side is a four-channels LVDS data interface, the lower part of the right side is a four-channels LVDS data interface.

The four-channels on the upper part of the right side are LVDS_R_UP1, LVDS_R_UP2, LVDS_R_UP3, LVDS_R_UP4. Wherein the LVDS_R_UP1 accepts the data derived by the CSEL_R_UP1, the LVDS_R_UP2 accepts the data derived by the CSEL_R_UP2, . . . , the LVDS_R_UP4 accepts the data derived by the CSEL_R_UP4.

The four-channels on the lower part of the right side are LVDS_R_DOWN1, LVDS_R_DOWN 2, LVDS_R_DOWN 3, LVDS_R_DOWN 4. Wherein the LVDS_R_DOWN1 accepts the data derived by the CSEL_R_DOWN1, the LVDS_R_DOWN2 accepts the data derived by the CSEL_R_DOWN2, the LVDS_R_DOWN3 accepts the data derived by the CSEL_R_DOWN3, the LVDS_R_DOWN4 accepts the data derived by the CSEL_R_DOWN4.

The module of the LVDS_CTRL is a control signal channel, which includes the setting information of the differential signal interface circuit, the frame head of the differential signal interface circuit, the frame tail of the differential signal interface circuit and the like. The left side of the module is an LVDS_CTRL L, which includes the setting information of the even columns, the frame head of the even columns, the frame tail of the even columns and the like, the right side of the module is LVDS_CTRL R, and which includes the setting information of the odd columns, the frame header of the odd columns, the frame tail of the odd columns and the like.

The module of the LVDS_CLK is a clock signal channel, including the clock information of the whole system. The left side of the module is a LVDS_CLK L, containing the clock information on the left side, and the right side of the module is a LVDS_CLK R, containing the clock information on the right side.

The control circuit is electrically connected to the readout circuit, the channel selection circuit and the interface circuit is used for controlling the transmission and working time sequence of each circuit. The control circuit includes a row decoding circuit and a digital signal control circuit. The row decoding circuit controls the transmission of the row direction of the readout circuit, the channel selection circuit and the interface circuit, the digital signal control circuit is used to control the readout circuit, the time sequence of the channel selection circuit and the interface circuit, the exposure time, the readout way and the readout mode of the readout circuit.

For example, the row decoding circuit mainly controls the row direction transmission of the readout circuit, the channel selection circuit and the interface circuit. That is, in the first time period, the image signal of the odd column pixel in the first row is transmitted to the PGA on the right side, and the image signal of the even column pixel in the first row is transmitted to the PGA on the left side, at this moment, the image signals of pixels in column 1, 3, 5, . . . , 5999 of the first row, and the image signals of pixels in column 2, 4, 6, . . . , 6000 of the first row are simultaneously transmitted to 3000 PGA on the right side and 3000 PGA on the left side respectively; In the second time period, the image signal of the odd column pixel in the second row is transmitted to the PGA on the right side, and the image signal of the even column pixel in the second row is transmitted to the PGA on the left side, at this moment, the image signals of pixels in column 1, 3, 5, . . . , 5999 of the second row, and the image signals of pixels in column 2, 4, 6, . . . , 6000 of the second row are simultaneously transmitted to 3000 PGA on the right side and 3000 PGA on the left side respectively; and so on.

The digital signal control circuit mainly loads the timing control and the function control of the whole system. The timing control includes pixel timing control, power on sequence, PGA timing control, ADC timing control, Digital Gain timing control, CSEL timing control, the LVDS timing control. The function control includes exposure time, interlaced readout, skip readout, high dynamic range mode and the like.

As shown in FIG. 1, the auxiliary circuits are respectively arranged above and below the pixel array for providing a reference and a reset voltage for the whole circuit. The auxiliary circuit includes a reference clock circuit, a reference voltage circuit, a reference pulse circuit and a power-on reset circuit. Wherein, the two sides of the control circuit are respectively provided with a reference clock circuit; the reference clock circuits on the two sides of the control circuit are respectively connected to a reference voltage circuit; and the reference pulse circuits are arranged above the readout circuits on the two sides of the pixel array respectively, the reference pulse circuit is electrically connected to the corresponding readout circuit below.

Specifically, the reference clock circuit is used for providing a clock signal for the whole system, the reference voltage circuit is used for providing a reference voltage for the whole system, the reference pulse circuit is used for providing a reference pulse signal for the whole system, and the power-on reset circuit is used to reset the digital signal control circuit of the whole system after the whole system is powered on, such as 1.2v, or when the power has a jump, such as 1.2v, and the power-on reset circuit of the whole system is integrated into one. Here, the reference clock circuit includes a phase-locked loop module (PLL), the reference voltage circuit includes a band-gap reference voltage module (Band Gap, BG), and the reference pulse circuit includes a ramp generation circuit and an analog driving circuit (analog driver); the ramp generating circuit is used for generating a reference pulse waveform which is used for comparing; the analog driving circuit provides enough driving force for the reference pulse circuit, for example, it can drive 6000 ADCs.

The power input/output interfaces (IO) are respectively arranged above and below the pixel array for each circuit to input or output powers signals; as shown in FIG. 1, the power input/output interface includes a power positive interface (VDDC), a power ground interface (VSSC), a power switch (power_IO), a control power interface (chip_ctrl_IO) of the whole system, a test interface (test IO), a serial external interface (SPI), and a power positive interface and a the ground interface of each circuit. Wherein the power positive interface and the ground interface of each circuit include: a power supply positive electrode of the ADC (ADC_AVDD), a power ground interface of the ADC (ADC_AVSS) and a low-voltage differential signal power interface (LV), a signal indicating end of a frame (FV), a 1.2V high-level positive electrode interface (VDDH) and a 1.2V high-level ground interface (VSSH), a power ground interface of a program global circuit (PGA_AVSS), and a power positive interface of a program global circuit (PGA_AVDDA), a power positive interface of pixel array (PIXEL_VDD), a power ground interface of the pixel array (PIXEL_VSS), a power ground interface of the row decoding circuit (RDC_VSS) and a power positive interface of the row decoding circuit (RDC_VDD).

Figure 3:
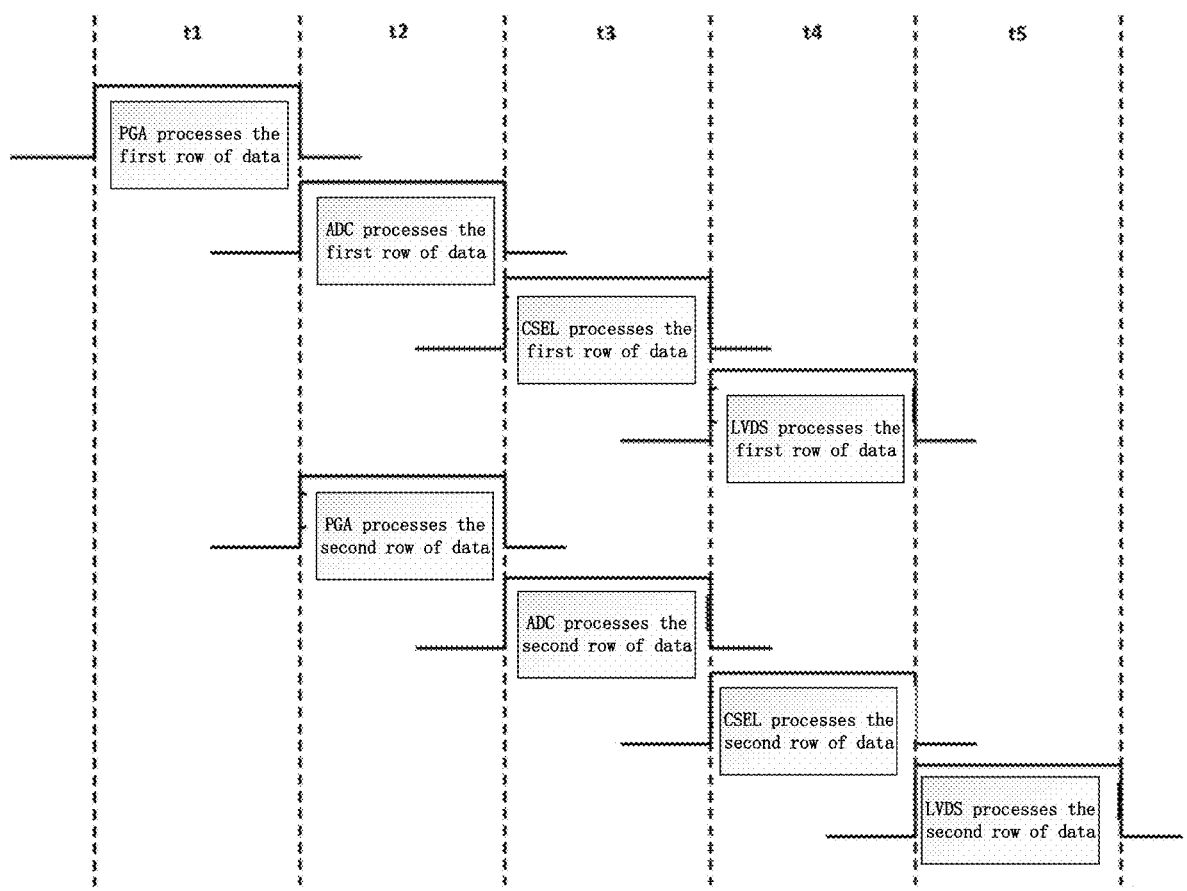
FIG. 3 is a working sequence diagram of a full-frame image sensor system according to a preferred embodiment of the present disclosure

Referring to FIG. 3, the working timing sequence of each circuit of the full-frame image sensor system according to the embodiment is as follows: in the time t1, the PGA processes the first row of data and then transmits the first row of data to the ADC; in the time t2, the first row of data is processed by the ADC and then is transmitted to the CSEL, at the same time, the second row of data is processed by the PGA and then is transmitted to the ADC; in the time t3, the first row of data is transmitted to the LVDS by the CSEL, and meanwhile, the second row of data is processed by the ADC and then is transmitted to the CSEL; in the time t4, the first row of data is transmitted to the output interface by the LVDS, and meanwhile, the second row of data is transmitted to the LVDS by the CSEL; in the time t5, the second row of data is transmitted to the outer interface by the LVDS, and so on, so that the transmission of all data in the entire pixel array can be completed.

While the present disclosure has been particularly shown and described with references to preferred embodiments thereof, if will be understood by those skilled in the art that various changes in form and details may be made herein without departing from the spirit and scope of the present disclosure as defined by the appended claims.

What is claimed is:

1. A full-frame image sensor system, which is integrated in a chip, comprising: a pixel array, at least a pair of readout circuits, at least a pair of channel selection circuits, at least a pair of interface circuits and a control circuit, at least a pair of power input-output interfaces and at least a pair of auxiliary circuits; wherein taking the pixel array as the center, the readout circuits, the channel selection circuits and the interface circuits are symmetrically arranged on two sides of the pixel array respectively, so that the center of the pixel array coincides with the center of the entire chip; the readout circuits are electrically connected to the pixel array from the two sides of the pixel array respectively; the channel selection circuit and the readout circuit on the same side of the pixel array are electrically connected to each other; the interface circuit and the channel selection circuit on the same side of the pixel array are electrically connected to each other; wherein the pixel array is used for detecting an image signal and outputting the image signal to the readout circuits; the readout circuits are used for receiving the image signal from the pixel array, amplifying the image signal, converting the amplified image signal into a digital signal, and then outputting the digital signal to the channel selection circuit; the channel selection circuit is used for amplifying the digital signal and then performing selective transmission; the interface circuit is used for outputting the digital signal to the outside interface; the control circuit is connected to the readout circuit, the channel selection circuit and the interface circuit, and is used for controlling the transmission and working time sequence of each circuit; the power input-output interfaces are respectively arranged above and below the pixel array, and is used for inputting or outputting a power signal of each circuit; the auxiliary circuits are arranged above and below the pixel array respectively, and are used for providing a reference voltage and a reset voltage for the whole circuit.

2. The full-frame image sensor system of claim 1, wherein the readout circuits on the two sides of the pixel array are divided into an upper readout circuit and a lower readout circuit; the channel selection circuits on the two sides of the pixel array are divided into an upper channel selection circuit and a lower channel selection circuit; the interface circuits on the two sides of the pixel array are divided into an upper interface circuit and a lower interface circuit; the upper readout circuit on the one side is electrically connected to the upper layer area of the pixel array, and the upper readout circuit on the other side is electrically connected to one side of the upper channel selection circuit, and the other side of the upper channel selection circuit is electrically connected to the upper interface circuit; and the lower readout circuit on the one side is electrically connected to the lower layer area of the pixel array, and the lower readout circuit on the other side is electrically connected to one side of the lower channel selection circuit, and the other side of the lower channel selection circuit is electrically connected to the lower interface circuit.

3. The full-frame image sensor system of claim 2, wherein the pixel array comprises an active pixel array used for acquiring image detection signal, a dark pixel array used for providing a reference signal without light, a dummy pixel array used for protecting the active pixel array, a reference pixel array used for providing a reference signal, and a barrier array used for isolating the pixel array; wherein after subtracting the reference signal of the dark pixel array and the reference signal of the reference pixel array from the image detection signal of the active pixel array, the final image signal for outputting to the readout circuit is obtained; the dummy pixel array is arranged around the active pixel array, the dark pixel array and the reference pixel array are arranged sequentially outside the same side of the active pixel array; and the barrier array is arranged around the dark pixel array, the reference pixel array and the dummy pixel array.

4. The full-frame image sensor system of claim 3, wherein the total pixel size of the pixel array is (3684-4512)×(5400-6600), the pixel size of the active pixel array is (3600-4400)×(5400-6600), the pixel size of the dark pixel array is (80-96)×(3604-6616), the pixel of the dummy pixel array and the barrier pixel array are 22-36 rows, and the pixel of the reference pixel array is 4-16 rows.

5. The full-frame image sensor system of claim 1, wherein the pixel array comprises an active pixel array used for acquiring image detection signal, a dark pixel array used for providing a reference signal without light, a dummy pixel array used for protecting the active pixel array, a reference pixel array used for providing a reference signal, and a barrier array used for isolating the pixel array; wherein after subtracting the reference signal of the dark pixel array and the reference signal of the reference pixel array from the image detection signal of the active pixel array, the final image signal for outputting to the readout circuit is obtained; the dummy pixel array is arranged around the active pixel array, the dark pixel array and the reference pixel array are arranged sequentially outside the same side of the active pixel array; and the barrier array is arranged around the dark pixel array, the reference pixel array and the dummy pixel array.

6. The full-frame image sensor system of claim 5, wherein the total pixel size of the pixel array is (3684-4512)×(5400-6600), the pixel size of the active pixel array is (3600-4400)×(5400-6600), the pixel size of the dark pixel array is (80-96)×(3604-6616), the pixel of the dummy pixel array and the barrier pixel array are 22-36 rows, and the pixel of the reference pixel array is 4-16 rows.

7. The full-frame image sensor system of claim 1, wherein the readout circuit comprises readout circuit links corresponding to each row of the pixel array respectively; each of the readout circuit links include a Programmable Gain Amplifier and an Analog-to-Digital Converter; the Programmable Gain Amplifier is used for amplifying the image signal, the Analog-to-Digital Converter is used for converting the amplified image signal into a digital signal.

8. The full-frame image sensor system of claim 1, wherein the channel selection circuit comprises a digital gain circuit and a column selection circuit; the digital gain circuit is used for amplifying the digital signal outputted by the readout circuit, the column selection circuit is used for selectively transmitting the digital signal amplified by the digital gain circuit.

9. The full-frame image sensor system of claim 1, wherein the interface circuit comprises a low-voltage differential signal interface, an interface circuit control channel and an interface circuit clock signal channel; the low-voltage differential signal interface is used for outputting digital data, and the interface circuit control channel is used for controlling the frame frequency information and the setting of the low-voltage differential signal interface, the interface circuit clock signal channel is used for providing the clock information to the interface circuit control channel.

10. The full-frame image sensor system of claim 1, wherein, the control circuit includes a row decoding circuit and a digital signal control circuit; the row decoding circuit is used for controlling the row direction transmission of the readout circuit, the channel selection circuit and the interface circuit; the digital signal control circuit is used for controlling the time sequence, the exposure time, the readout way and the readout mode of the readout circuit, the channel selection circuit and the interface circuit.

11. The full-frame image sensor system of claim 1, wherein the auxiliary circuit comprises reference clock circuits, reference voltage circuits, reference pulse circuits, and a power-on reset circuit; wherein the two sides of the control circuit are respectively provided with one of the reference clock circuits; the reference clock circuits on the two sides of the control circuit are respectively connected to one of reference voltage circuits; and the reference pulse circuits are arranged above the readout circuits on the two sides of the pixel array respectively, the reference pulse circuit is electrically connected to the corresponding readout circuit below the reference pulse circuit; the power-on reset circuit is integrated into one; the reference clock circuit is used for providing a clock signal for the whole system, the reference voltage circuit is used for providing a reference voltage for the whole system, the reference pulse circuit is used for providing a reference pulse signal for the whole system, and the power-on reset circuit is used to reset the digital signal control circuit of the whole system after power on or when power source has a transition; the reference clock circuit includes a phase-locked loop module, the reference voltage circuit includes a band-gap reference voltage module, the reference pulse circuit includes a ramp generating circuit and an analog driving circuit; the ramp generating circuit is used for generating a reference pulse waveform; the analog driving circuit provides driving force for the reference pulse circuit.

12. The full-frame image sensor system of claim 1, wherein the power input-output interface comprises a power positive interface, a power ground interface, a power switch, a control power interface of the whole system, a test interface, a power positive interface and ground interface of each circuit.

\* \* \* \* \*